US 12,208,556 B2

(12) United States Patent
Sato et al.

(10) Patent No.: US 12,208,556 B2
(45) Date of Patent: Jan. 28, 2025

(54) SCREW, EXTRUDER AND EXTRUSION METHOD

(71) Applicant: Nakata Engineering Co., Ltd., Hyogo (JP)

(72) Inventors: Tadasuke Sato, Kobe (JP); Makoto Noda, Kobe (JP)

(73) Assignee: Nakata Engineering Co., Ltd., Hyogo (JP)

( * ) Notice: Subject to any disclaimer, the term of this patent is extended or adjusted under 35 U.S.C. 154(b) by 235 days.

(21) Appl. No.: 17/759,274

(22) PCT Filed: Sep. 24, 2020

(86) PCT No.: PCT/JP2020/036056
§ 371 (c)(1),
(2) Date: Jul. 21, 2022

(87) PCT Pub. No.: WO2021/149304
PCT Pub. Date: Jul. 29, 2021

(65) Prior Publication Data
US 2023/0075388 A1    Mar. 9, 2023

(30) Foreign Application Priority Data
Jan. 23, 2020  (JP) .................................. 2020-008850

(51) Int. Cl.
*B29C 48/59*  (2019.01)
*B29C 48/08*  (2019.01)
(Continued)

(52) U.S. Cl.
CPC .............. *B29C 48/66* (2019.02); *B29C 48/08* (2019.02); *B29C 48/59* (2019.02); *B29C 48/681* (2019.02);
(Continued)

(58) Field of Classification Search
CPC ..... B29C 48/59; B29C 48/605; B29C 48/615; B29C 48/62; B29C 48/505; B29C 48/565; B29C 48/535; B29C 48/66
See application file for complete search history.

(56) References Cited

U.S. PATENT DOCUMENTS 2,813,302 A  *  11/1957  Beck ....................... B29C 48/56
                                                              425/207
5,145,352 A  *   9/1992  Capelle .................. B29C 48/63
                                                              366/89
(Continued)

FOREIGN PATENT DOCUMENTS

JP    2019-043043 A     3/2019
JP    2020131656 A  *   8/2020  ............. B29B 7/421
WO   WO-2020174793 A1 *  9/2020  ............. B29B 7/421

OTHER PUBLICATIONS

International Search Report issued in PCT/JP2020/036056; mailed Oct. 27, 2020.

*Primary Examiner* — Matthew J Daniels
(74) *Attorney, Agent, or Firm* — Studebaker & Brackett PC

(57) ABSTRACT

A screw has a spiral blade for extruding and kneading a high-silica plastic elastomer containing not less than 100 phr of silica. The screw has a first section located on the most downstream side in the extrusion direction and provided with a barrier extending between the adjacent spiral blade threads, while inclining with respect to the screw axial direction. The length of the barrier is 1.5 to 3.0 times the lead length of the spiral blade in the first section. The height of the barrier is 2 to 10 mm lower than the height of the spiral blade. The barrier thickness is 0.9 to 3.0 times the height difference between the spiral blade and barrier.

6 Claims, 6 Drawing Sheets

(51) Int. Cl.
*B29C 48/66* (2019.01)
*B29C 48/68* (2019.01)
*B29C 48/685* (2019.01)
*B29K 21/00* (2006.01)

(52) U.S. Cl.
CPC ...... *B29C 48/687* (2019.02); *B29K 2021/003* (2013.01)

(56) References Cited

U.S. PATENT DOCUMENTS

| | | | |
|---|---|---|---|
| 6,547,431 B1 * | 4/2003 | Womer | B29C 48/64 366/90 |
| 2022/0080620 A1 * | 3/2022 | Sato | B29C 48/687 |

* cited by examiner

SCREW, EXTRUDER AND EXTRUSION METHOD

TECHNICAL FIELD

The present invention relates to a screw having a spiral blade for extruding and kneading a plastic elastomer, an extruder including the screw, and an extrusion method.

BACKGROUND ART

Conventionally, there have been known various screws having a spiral blade for extruding and kneading a plastic elastomer.

For example, Patent Document 1 below proposes a screw capable of improving the productivity of a plastic elastomer while maintaining good quality by providing a kneading promoting section.

PRIOR ART DOCUMENT

Patent Document

Patent Document 1: Japanese Patent Application Publication No.2019-043043

SUMMARY OF THE INVENTION

Problems to be Resolved by the Invention

In the screw of Patent Document 1, however, the productivity may decrease depending on the type of the elastomer to be kneaded, such as an elastomer containing silica since a barrier is provided along the screw axial direction. Therefore, even in the screw of Patent Document 1, further improvement is desired for both quality and productivity.

The present invention was devised in view of the above circumstances, and a primary object is to provide a screw, an extruder and an extrusion method capable of improving the applicable range of elastomers in which both quality and productivity can be achieved.

Means for Solving the Problems

The present invention is a screw having a spiral blade for extruding a plastic elastomer containing not less than 100 phr of silica while kneading it, which is characterized by having a first section arranged on the most downstream side in the extrusion direction,
  the first section is provided with a barrier extending between the spiral blade threads adjacent to each other in the extrusion direction while inclining with respect to the screw axial direction,
  the length of the barrier in its longitudinal direction is 1.5 to 3.0 times the lead length of the spiral blade in the first section,
  the height of the barrier is smaller than the height of the spiral blade,
  the difference between the height of the spiral blade and the height of the barrier is 2 to 10 mm, and
  the thickness of the barrier is 0.9 to 3.0 times the difference between the height of the spiral blade and the height of the barrier.

In the screw of the present invention, it is preferable that the one through four barriers are formed in the first section.

In the screw of the present invention, it is preferable to have a second section arranged on the upstream side in the extrusion direction of the first section, and in the second section, the spiral blade is provided with a notch for passing a pin.

In the screw of the present invention, it is preferable to have a third section arranged on the upstream side in the extrusion direction of the second section, continuously from the second section, and
  in the third section, at least a part of the spiral blade is formed as a single flight.

In the screw of the present invention, it is preferable that, a part of the third section on the most upstream side in the extrusion direction is formed with multiple flights.

The present invention is an extruder including the above-mentioned screw and a barrel in which the screw is arranged, which is characterized in that the barrel includes a plurality of pins inserted into the notch formed in the spiral blade in the second section.

The present invention is characterized by being an extruder including the above-mentioned screw and a barrel in which the screw is arranged.

The present invention is an extrusion method for extruding the above-mentioned elastomer by utilizing the above-mentioned extruder, which comprises a feeding step of feeding the elastomer into the barrel, and an extruding step of extruding the elastomer while kneading the elastomer, and the extruding step is characterized by including a transforming step of transforming the elastomer into a thin film by using the barrier.

Effects of the Invention

In the screw of the present invention, the first section is provided with the barrier which extends between the spiral blade threads adjacent to each other in the extrusion direction while inclining with respect to the screw axial direction, the length of the barrier in the longitudinal direction is 1.5 to 3.0 times the lead length of the spiral blade in the first section, the height of the barrier is smaller than the height of the spiral blade, the difference between the height of the spiral blade and the height of the barrier is 2 to 10 mm, and the thickness of the barrier is 0.9 to 3.0 times the difference between the height of the spiral blade and the height of the barrier.

In such screw, by the barrier inclined with a specific length, it is possible to sequentially transform the elastomer into a thin film while securing the amount of the passing elastomer. Therefore, the screw of the present invention can secure the amount of the extruded elastomer while suppressing the excessive heat generation of the elastomer.

Further, such barrier can efficiently convey and transform the elastomer even if it is a high-silica compound, without generating bubbles in the inside, so it is possible to improve the surface condition of the elastomer. Therefore, the screw of the present invention can improve the applicable range of the elastomer in which both quality and productivity can be achieved.

MODE FOR CARRYING OUT THE INVENTION

Hereinafter, an embodiment of the present invention will be described in detail with reference to the drawings.

Figure 1:
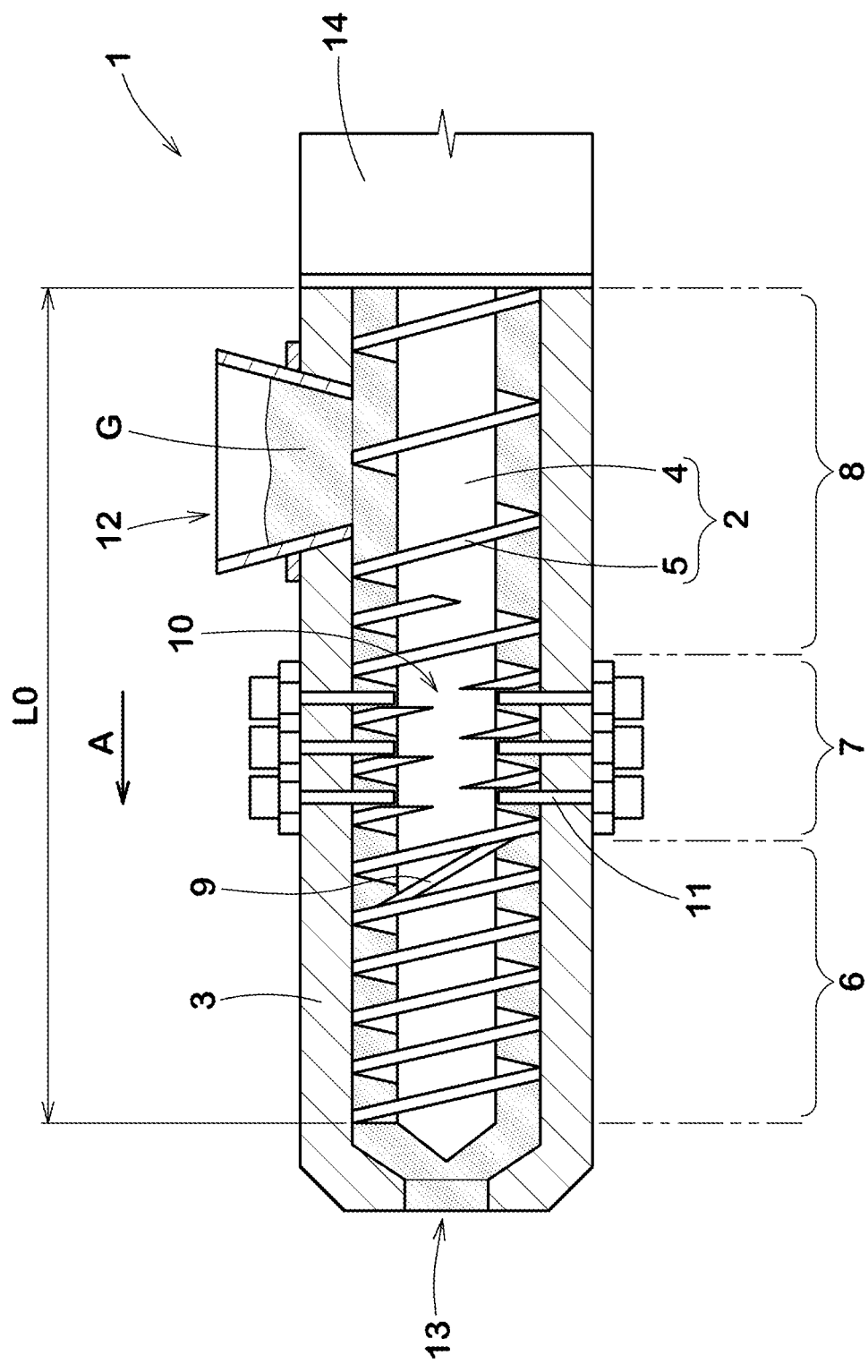
FIG. 1 is a side view showing an embodiment of the extruder of the present invention.

FIG. 1 is a side view showing an extruder 1 of the present embodiment.

As shown in FIG. 1, the extruder 1 of the present embodiment includes a screw 2 for extruding a plastic elastomer G in an extrusion direction A while kneading it, and a barrel 3 in which the screw 2 is arranged.

Examples of the plastic elastomer G include unvulcanized rubber, thermoplastic elastomers and the like.

The elastomer G is not particularly limited, but in the case of rubber for tires, for example, it is preferably a high-silica compound which contains preferably not less than 50 phr of silica, more preferably not less than 100 phr of silica due to the recent demand for fuel efficiency.

The screw 2 of the present embodiment has a screw shaft 4 and a spiral blade 5 protruding radially outward from the screw shaft 4.

The spiral blade 5 of the present embodiment is for extruding the plastic elastomer G while kneading it.

The screw 2 of the present embodiment has a first section 6 arranged on the downstream side in the extrusion direction A, a second section 7 arranged on the upstream side in the extrusion direction A of the first section 6, and a third section 8 arranged on the upstream side in the extrusion direction A of the second section 7.

The first section 6, the second section 7, and the third section 8 are, for example, arranged continuously in the extrusion direction A.

Figure 2:
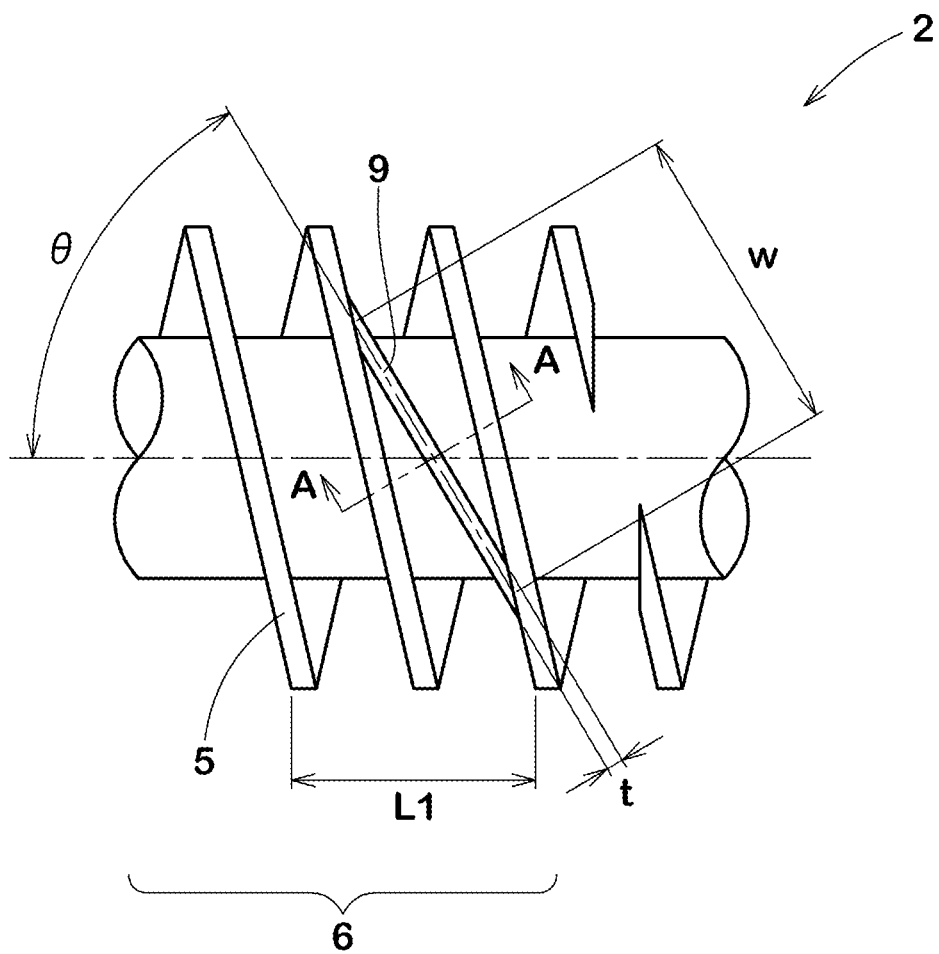
FIG. 2 is a partial side view of the first section.

FIG. 2 is a partial side view of the first section 6.

As shown in FIGS. 1 and 2, in the first section 6 of the present embodiment, there is formed a barrier 9 which extends between the spiral blade threads 5 adjacent in the extrusion direction A, while inclining with respect to the screw axial direction.

The length w in the longitudinal direction of the barrier 9 is preferably 1.5 to 3.0 times the lead length L1 of the spiral blade 5 in the first section 6.

Here, the barrier 9 extending while inclining with respect to the screw axial direction means that the longitudinal direction of the barrier 9 has an angle θ larger than 0 degrees and smaller than 90 degrees with respect to the screw axial direction.

Since such barrier 9 is inclined with a specific length, it is possible to secure the amount of the passing elastomer G while sequentially transforming the elastomer G into a thin film. Therefore, the screw 2 of the present embodiment can secure the amount of the extruded elastomer G while suppressing the excessive heat generation of the elastomer G.

Further, such barrier 9 can efficiently convey and transform the elastomer G even if it is a high-silica one, without generating bubbles in the inside, so it is possible to improve the surface condition of the elastomer G.

Therefore, the screw 2 of the present embodiment can improve the applicable range of the elastomer G in which both quality and productivity can be achieved.

The length w in the longitudinal direction of the barrier 9 is more preferably not less than 2.0 times the lead length L1 of the spiral blade 5 in the first section 6.

Further, the length w in the longitudinal direction of the barrier 9 is more preferably not more than 2.5 times the lead length L1 of the spiral blade 5 in the first section 6.

Such barrier 9 is suitable for efficiently conveying and transforming the high-silica elastomer G, and helps to achieve both the quality and productivity of the elastomer G.

The angle θ of the barrier 9 with respect to the screw axial direction is preferably not less than 10 degrees, more preferably not less than 20 degrees, and preferably not more than 80 degrees, more preferably not more than 70 degrees. Such barrier 9 is suitable for efficiently conveying and transforming the high-silica elastomer G, and helps to achieve both the quality and productivity of the elastomer G.

In the first section 6 of the present embodiment, the spiral blade 5 is formed as double flights.

The spiral blade 5 of the first section 6 is not limited to the double flights, and may be, for example, a single flight or multiple flights more than two flights.

Further, the first section 6 may be formed by portions different in the number of flights, for example.

Here, the single flight is an illustrative embodiment having one spiral blade 5 at a same axial position of the screw shaft 4.

Further, the double flights are an illustrative embodiment having two spiral blades 5 at a same axial position of the screw shaft 4.

Further, the multiple flights are illustrative embodiments having two or more spiral blades 5 at a same axial position of the screw shaft 4.

The double flights are one embodiment of the multiple flights.

Preferably, the one through four barriers 9 are formed in the first section 6.

In the present embodiment, the first section 6 provided with the one barrier 9 is illustrated by an example.

Since such first section 6 can transform the elastomer G into a thin film by using the barrier 9 and flow it toward the downstream in the extrusion direction A, it is possible to uniformly and finely cut the molecules of the elastomer G.

Therefore, the extruder 1 of the present embodiment can decrease the expansion coefficient of the extruded elastomer G and improve the surface condition of the elastomer G.

Therefore, the extruder 1 of the present embodiment can improve the surface condition of the elastomer G while stabilizing the shape of the elastomer G after extruded, so it is possible to extrude the high-quality elastomer G.

Figure 3:
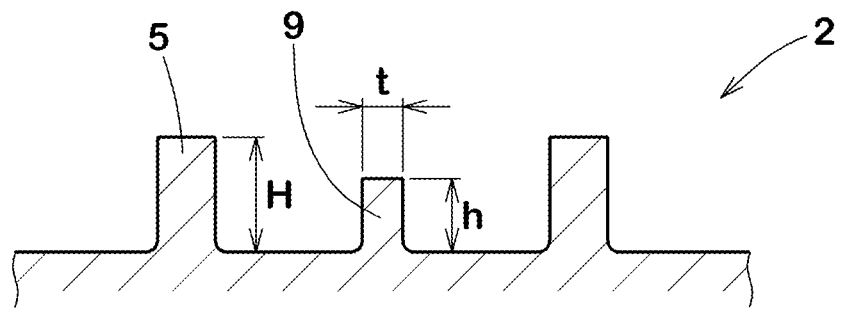
FIG. 3 is a partial cross-sectional view taken along line A-A of FIG. 2.

FIG. 3 is a cross-sectional partial view taken along line A-A of FIG. 2. As shown in FIG. 3, the height h of the barrier 9 of the present embodiment is smaller than the height H of the spiral blade 5.

The difference (H-h) between the height H of the spiral blade 5 and the height h of the barrier 9 is preferably 2 to 10 mm.

Since the difference (H-h) is not less than 2 mm, it is possible to secure the extrusion amount of the elastomer G while suppressing the excessive heat generation of the elastomer G, and it is possible to achieve both quality and productivity.

Since the difference (H-h) is not more than 10 mm, the transformation of the elastomer G can be promoted and the quality can be improved.

The thickness t of the barrier 9 is preferably 0.9 to 3.0 times the difference (H-h) between the height H of the spiral blade 5 and the height h of the barrier 9.

Since the thickness t is not less than 0.9 times the difference (H-h), the transformation of the elastomer G can be promoted and the quality can be improved.

Since the thickness t is not more than 3.0 times of the difference (H-h), it is possible to secure the extrusion amount of the elastomer G, while suppressing the excessive heat generation of the elastomer G, and it is possible to achieve both quality and productivity.

As shown in FIG. 1, in the second section 7 of the present embodiment, the spiral blade 5 is formed as double flights.

The spiral blade 5 in the second section 7 is not limited to double flights, and may be a single flight or multiple flights more that two flights, for example.

Further, the second section 7 may be formed by portions different in the number of flights, for example.

In the second section 7 of the present embodiment, the spiral blade 5 is provided with a notch 10 for passing a pin.

It is preferable that the barrel 3 includes a plurality of pins 11 inserted into the notch 10 formed in the spiral blade 5 in the second section 7.

In such second section 7, the elastomer G kneaded between the screw 2 and the barrel 3 can be sheared by the pins 11 to enhance the mixing and dispersing effect on the elastomer G, and the quality of the elastomer G can be improved.

The pins 11 are provided in a plurality of rows, for example, 2 to 5 rows in the axial direction of the screw shaft 4.

In the present embodiment, there is shown an example in which three rows of the pins 11 are provided in the axial direction of the screw shaft 4.

With respect to a same axial position of the screw shaft 4, a plurality of the pins 11, for example, the four through eight pins 11 are provided.

Such pins 11 enhance the mixing and dispersing effect on the elastomer G, and help to improve the quality of the elastomer G.

It is preferable that each of the pins 11 is configured to be able to change the amount of protrusion into the inside of the barrel 3.

Such pins 11 can individually adjust the amount of protrusion according to the elastomer G to be kneaded.

In the third section 8 of the present embodiment, at least a part of the spiral blade 5 is formed as a single flight.

In such third section 8, the conveyance of the fed elastomer G is good, and the elastomer G can be efficiently conveyed toward the second section 7 side, so the productivity can be improved.

It is preferable that the third section 8 is in a range from 20% to 40% of the total screw length L0.

Since the third section 8 is not less than 20% of the total screw length L0, the elastomer G can be efficiently conveyed and the productivity can be improved.

Since the third section 8 is not more than 40% of the total screw length L0, it is possible to relatively widen the range of the first section 6 and the second section 7, which helps to improve the quality of the elastomer G.

The barrel 3 of the present embodiment includes a feed port 12 for feeding the elastomer G, and a discharge port 13 for discharging the kneaded elastomer G.

It is preferable that the feed port 12 is provided at a position corresponding to the third section 8 of the screw 2.

It is preferable that the discharge port 13 is provided on the downstream side in the extrusion direction A, of the first section 6 of the screw 2.

Such barrel 3 can increase the distance from the feed port 12 to the discharge port 13, and helps to improve the quality of the elastomer G.

It is preferable that the screw 2 is rotated in one direction by a drive unit 14 provided on the upstream side of the barrel 3 in the extrusion direction A.

The rotation speed of the screw 2 can be appropriately adjusted by the drive unit 14.

Such screw 2 can easily change the rotation speed according to the operating condition of the extruder 1.

Next, the extrusion method of the present embodiment will be described with reference to FIGS. 1 to 3.

Figure 4:
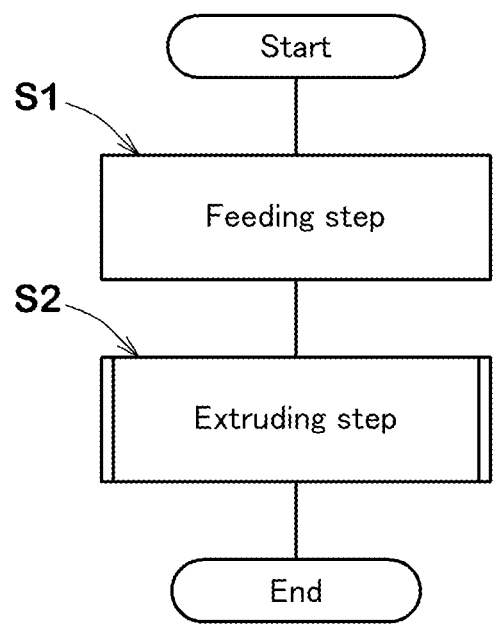
FIG. 4 is a flowchart of the extrusion method.

FIG. 4 is a flowchart of the extrusion method of the present embodiment.

As shown in FIG. 4, the extrusion method of the present embodiment utilizes the extruder 1 and is suitable for extruding a high-silica elastomer G containing preferably not less than 50 phr of silica, more preferably not less than 100 phr of silica.

In the extrusion method of the present embodiment, first, there is performed a feeding step S1 of feeding the elastomer G into the barrel 3.

In the feeding step S1, the elastomer G is continuously fed, for example.

It is preferable that the feeding speed of the elastomer G is appropriately adjusted according to the operating condition of the extruder 1.

In such feeding step S1, even if the elastomer G is a high-silica compound, an appropriate amount of the elastomer G can be fed into the barrel 3.

In the extrusion method of the present embodiment, after the feeding step S1, there is performed an extruding step S2 of extruding the elastomer G while kneading it.

In the extruding step S2, it is preferable that the elastomer G is sequentially extruded in the extrusion direction A by rotating the screw 2.

Such extruding step S2 can extrude so as to achieve both the quality and productivity of the high-silica elastomer G.

Figure 5:
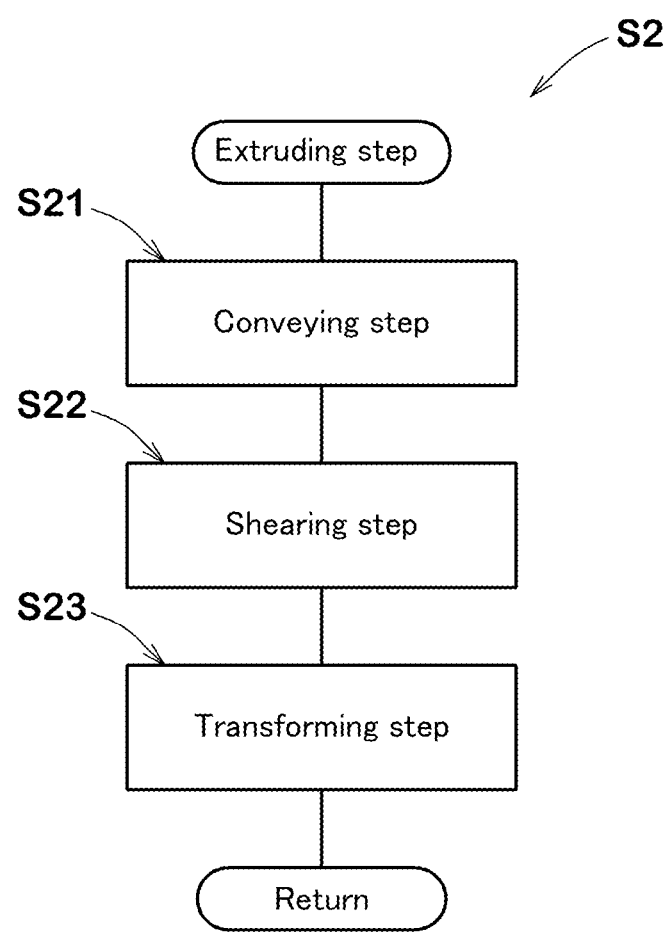
FIG. 5 is a flowchart of the extruding step.

FIG. 5 is a flowchart of the extruding step S2.

As shown in FIG. 5, in the extruding step S2 of the present embodiment, first, there is performed a conveying step S21 of conveying the fed elastomer G toward the downstream side in the extrusion direction A.

It is preferable that the conveying step S21 is performed in the third section 8 of the screw 2.

In such conveying step S21, the high-silica elastomer G can be efficiently conveyed, and the productivity can be improved.

In the extruding step S2 of the present embodiment, after the conveying step S21, there is performed a shearing step S22 in which, by the pins 11, the elastomer G kneaded between the screw 2 and the barrel 3 is sheared.

The shearing step S22 is preferably performed in the second section 7 of the screw 2.

In such shearing step S22, the mixing and dispersing effect on the high-silica elastomer G is enhanced and the quality can be improved.

In the extruding step S2 of the present embodiment, after the shearing step S22, there is performed a transforming step S23 in which, by the barrier 9, the elastomer G is transformed into a thin film.

It is preferable that the transforming step S23 is performed in the first section 6 of the screw 2.

Such transforming step S23 can secure the extrusion amount of the elastomer G while suppressing the excessive heat generation of the elastomer G, and it is possible to achieve both quality and productivity.

Figure 6:
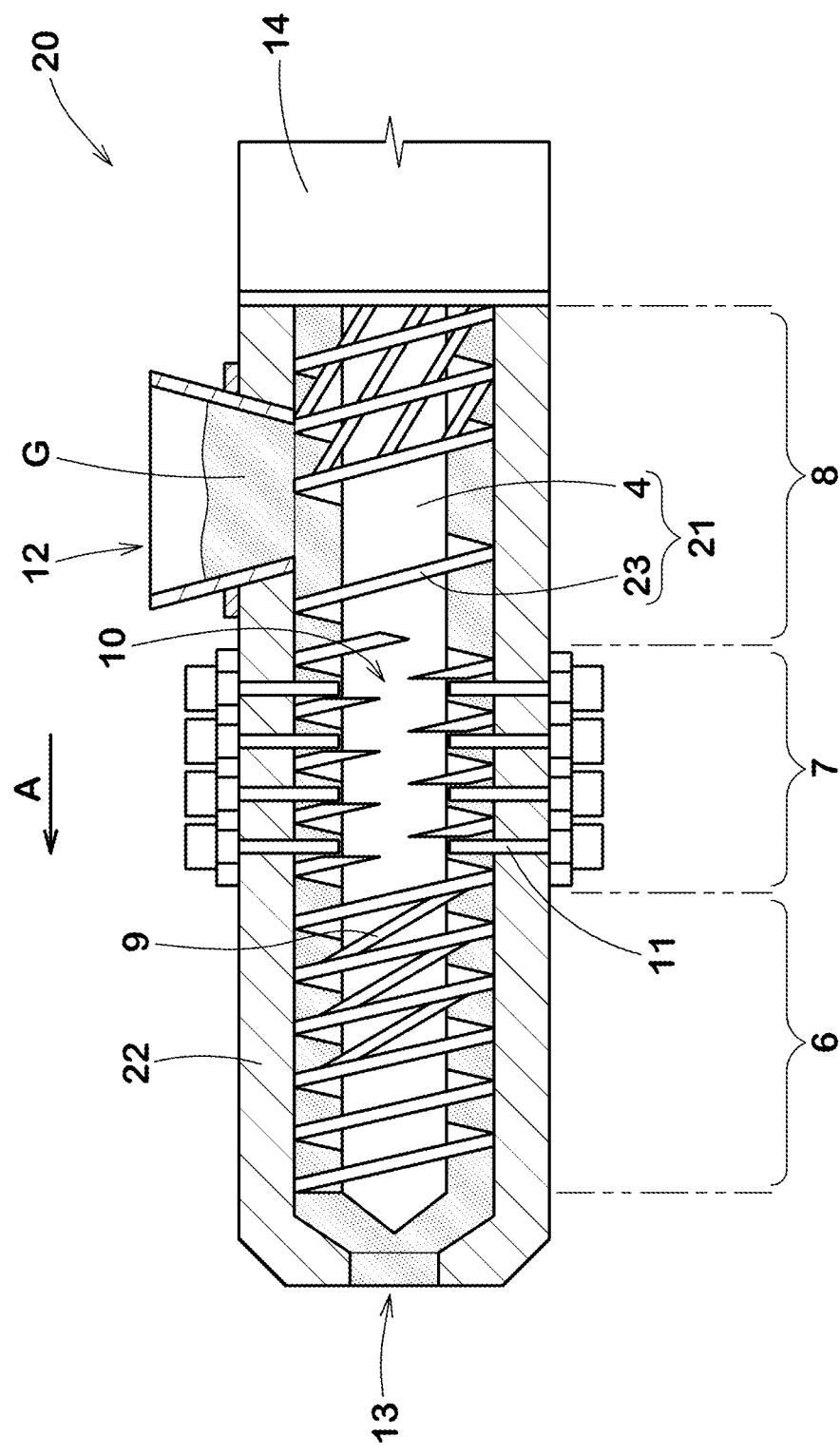
FIG. 6 is a side view of the extruder of another embodiment.

FIG. 6 is a side view of an extruder 20 of another embodiment.

Elements having the same function as the above-described embodiment are designated by the same reference numeral, and the description thereof will be omitted.

As shown in FIG. 6, the extruder 20 of this embodiment includes a screw 21 for extruding the plastic elastomer G in the extrusion direction A while kneading it, and a barrel 22 in which the screw 21 is disposed.

The screw 21 of this embodiment has a screw shaft 4 and a spiral blade 23 protruding radially outward from the screw shaft 4.

It is preferable that, similar to the screw 2 described above, the screw 21 has the first section 6 arranged on the downstream side in the extrusion direction A, the second section 7 arranged on the upstream side in the extrusion direction A of the first section 6, and the third section 8 arranged on the upstream side in the extrusion direction A of the second section 7.

In this embodiment, there is illustrated an example in which the three barriers 9 are formed in the first section 6.

Such first section 6 can more finely cut the molecules of the elastomer G by the barriers 9, and can further improve the quality of the elastomer G.

In this embodiment, there is illustrated an example in which four rows of the pins 11 are provided in the axial direction of the screw shaft 4 in the second section 7.

Such pins 11 can further enhance the mixing and dispersing effect on the elastomer G and further improve the quality of the elastomer G.

In this embodiment, a part of the third section 8 on the upstream side in the extrusion direction A is formed as multiple flights.

In this embodiment, there is illustrated an example in which a part of the third section 8 on the upstream side in the extrusion direction A is formed as double flights and six flights.

Such third section 8 promotes the mixing and dispersing while maintaining the biting to the elastomer G fed from the feed port 12, and helps to achieve both the quality and productivity of the elastomer G.

While particularly preferred embodiments of the present invention has been described in detail above, the present invention is not limited to the above-described embodiments and can be embodied by modifying into various modes.

Embodiments

Based on specifications shown in Tables 1 and 2, screws of the embodiment shown in FIGS. 1 to 3 and 6 were experimentally manufactured.

As comparative examples,
a screw of Comparative Example 1 in which the third section was formed as double flights and no barrier was provided, and a screw of Comparative Example 2 in which the third section was formed as a single flight and a barrier extended in the axial direction of the screw shaft were experimentally manufactured.

Using extruders including the prototype screws, and according to the extrusion method shown in FIGS. 4 and 5, a test to extrude the elastomer was performed, and the quality of the extruded elastomer and the productivity were evaluated.

The common items of the test and the test method are as follows.

Common Items

Elastomer: unvulcanized rubber containing 100 phr of silica
First section: double flights
second section: double flights Quality Test The surface condition of the extruded elastomer was measured as the surface roughness determined by the arithmetic mean height.

As the results, reciprocals of the surface roughness are indicated by an index based on Comparative Example 1 being 100, wherein the larger the value, the better the surface condition and the better the quality.

Productivity Test

The amount of the extruded elastomer was measured.
The results are indicated by an index based on Comparative Example 1 being 100, wherein the larger the value, the larger the extrusion amount and the better the productivity.

The test results are shown in Tables 1 and 2.

TABLE 1

|  | comparative example 1 | comparative example 2 | embodiment 1 | embodiment 2 | embodiment 3 | embodiment 4 |
| --- | --- | --- | --- | --- | --- | --- |
| number of barriers (pieces) | 0 | 1 | 1 | 3 | 1 | 1 |
| barrier angle θ (degrees) | — | 0 | 60 | 60 | 30 | 60 |
| ratio w/L1 of barrier length w to lead length L1 (times) | — | 0.5 | 1.5 | 1.5 | 1.5 | 3.0 |
| height difference (H − h) (mm) | — | 1 | 5 | 5 | 5 | 5 |
| ratio t/(H − h) of barrier thickness t and height difference (H − h) (times) | — | 5.0 | 1.0 | 1.0 | 1.0 | 1.0 |
| number of pin rows (rows) | 3 | 3 | 3 | 3 | 3 | 3 |
| third section | double flights | single flight | single flight (see FIG. 1) | single flight (see FIG. 1) | single flight (see FIG. 1) | single flight (see FIG. 1) |
| quality | 100 | 105 | 101 | 110 | 104 | 101 |
| productivity | 100 | 80 | 110 | 105 | 98 | 115 |

TABLE 2

| | embodiment 5 | embodiment 6 | embodiment 7 | embodiment 8 | embodiment 9 |
|---|---|---|---|---|---|
| number of barriers (pieces) | 1 | 1 | 1 | 1 | 3 |
| barrier angle θ (degrees) | 60 | 60 | 60 | 60 | 60 |
| ratio w/L1 of barrier length w to lead length L1 (times) | 1.5 | 1.5 | 1.5 | 1.5 | 1.5 |
| height difference (H − h) (mm) | 2 | 10 | 5 | 5 | 5 |
| ratio t/(H − h) of barrier thickness t and height difference (H − h) (times) | 2.5 | 0.9 | 1.0 | 1.0 | 1.0 |
| number of pin rows (rows) | 3 | 3 | 4 | 3 | 4 |
| third section | single flight (see FIG. 1) | single flight (see FIG. 1) | single flight (see FIG. 1) | single flight + double flights + six flights (see FIG. 6) | single flight + double flights + six flights (see FIG. 6) |
| quality | 108 | 85 | 103 | 102 | 120 |
| productivity | 95 | 120 | 108 | 109 | 105 |

It was confirmed from the test results that, as compared with the extruders of the comparative examples, the extruders of the embodiments were improved in the total value of the evaluation of the quality test and the productivity test, and both the quality and productivity were achieved with respect to the unvulcanized high-silica rubber.

DESCRIPTION OF THE SIGNS

2 Screw
5 Spiral blade
6 First region
9 Barrier

The invention claimed is:

1. A screw having a spiral blade for extruding a plastic elastomer containing not less than 100 phr of silica while kneading it, which has a first section arranged on a most downstream side in an extrusion direction, wherein
the first section provided with a barrier between spiral blade threads adjacent to each other in the extrusion direction,
a length of the barrier in its longitudinal direction is 1.5 to 3.0 times a lead length of the spiral blade in the first section,
a height of the barrier is smaller than the height of the spiral blade,
a difference between a height of the spiral blade and the height of the barrier is 2 to 10 mm,
a thickness of the barrier is 0.9 to 3.0 times the difference between the height of the spiral blade and the height of the barrier,
the barrier extends from a continuous portion of one of the spiral blade threads to a continuous portion of the other of the spiral blade threads while inclining with respect to a screw axial direction,
the first section is provided with up to four barriers,
the screw is provided with a second section which is arranged on an upstream side in the extrusion direction of the first section and in which the spiral blade is formed with a notch for passing a pin,
the screw is provided with a third section which is arranged on the upstream side in the extrusion direction of the second section, continuously from the second section, and in which at least a part of the spiral blade is formed as a single flight, and
in a part of the third section on a most upstream side in the extrusion direction, the spiral blade is formed as multiple flights.

2. An extruder comprising the screw as set forth in claim 1 and a barrel in which the screw is arranged, wherein
the barrel includes a plurality of pins inserted into the notch formed in the spiral blade in the second section.

3. The extruder as set forth in claim 2, wherein
the barrel is provided, at a position corresponding to the third section of the screw, with a feed port for feeding the elastomer.

4. The extruder as set forth in claim 3, wherein
the third section is in a range from 20% to 40% of a total length of the screw.

5. The extruder as set forth in claim 4, wherein
an angle of the barrier with respect to the screw axial direction is not less than 20 degrees, and not more than 70 degrees.

6. An extrusion method for extruding the elastomer by utilizing the extruder as set forth in claim 2, which comprises
a feeding step of feeding the elastomer into the barrel, and an extruding step of extruding the elastomer while kneading the elastomer, and
the extruding step including a transforming step of transforming the elastomer into a thin film by using the barrier.

* * * * *